United States Patent [19]

Lord

[11] Patent Number: 5,502,301
[45] Date of Patent: Mar. 26, 1996

[54] FIBER OPTIC SENSORS AND CONTROL SYSTEMS FOR AUTOMOBILE OCCUPANT PROTECTION APPARATUS

[75] Inventor: Randal B. Lord, Inman, S.C.

[73] Assignee: Thomas & Betts Corporation

[21] Appl. No.: 247,748

[22] Filed: May 23, 1994

[51] Int. Cl.⁶ .................................................. H01J 5/16
[52] U.S. Cl. ................... 250/227.14; 180/274; 280/735; 340/555; 250/227.16
[58] Field of Search .................. 250/227.14, 227.15, 250/227.16, 227.24, 231.19; 73/794, 812, 813, 823; 340/665, 677, 555–557; 180/274; 280/735; 385/12, 13

[56] References Cited

U.S. PATENT DOCUMENTS

| | | | |
|---|---|---|---|
| 4,408,829 | 10/1983 | Fitzgerald, Jr. et al. | 385/12 |
| 4,420,251 | 12/1983 | James et al. | 356/32 |
| 4,701,614 | 10/1987 | Jaeger et al. | 250/227 |
| 4,750,796 | 6/1988 | Shibata et al. | 385/13 |
| 4,830,461 | 5/1989 | Ishiharada et al. | 385/13 |
| 4,860,586 | 8/1989 | Miers et al. | 73/517 |
| 4,918,305 | 4/1990 | Wlodarczyk | 250/227.14 |
| 4,988,862 | 1/1991 | Beltz | 250/227.15 |
| 5,072,110 | 12/1991 | Lu et al. | 250/227.14 |
| 5,261,505 | 11/1993 | Holroyd et al. | 180/274 |
| 5,430,815 | 7/1995 | Shen et al. | 250/227.16 |

FOREIGN PATENT DOCUMENTS 61-80224   4/1986   Japan .

*Primary Examiner*—Edward P. Westin
*Assistant Examiner*—Que T. Le
*Attorney, Agent, or Firm*—Salvatore J. Abbruzzese

[57] ABSTRACT

A fiber optic sensor for the sensing of forces imposed on the sensor in a predetermined direction comprises a housing and an optical fiber of a type which is self-deformable in response to forces imposed on the sensor. The housing retentively engages first and second opposed ends of the fiber and places the fiber in tangential contiguity with an interior surface of the housing. The housing defines a cavity aside the fiber permitting movement of the fiber therein and distal from the tangential contiguity thereof with the interior surface. In the predetermined force imposition direction, the cavity is successive to the interior surface of the housing. A system is provided for generating an input signal for control of automobile occupant protection apparatus of an automobile having a preselected forward travelling direction, the system comprising first apparatus, inclusive of a first fiber optic sensor responsive to first forces imposed thereon in a first direction opposite the preselected forward travelling direction, for providing a first output indicative of characteristics of the first forces, second apparatus, inclusive of a second fiber optic sensor responsive to second forces imposed thereon in a second direction different from the direction opposite the preselected forward travelling direction, for providing a second output indicative of characteristics of the second forces and third apparatus responsive to the first and second outputs for selectively generating the input signal.

23 Claims, 3 Drawing Sheets

FIBER OPTIC SENSORS AND CONTROL SYSTEMS FOR AUTOMOBILE OCCUPANT PROTECTION APPARATUS

FIELD OF THE INVENTION

This invention relates generally to control systems employing force-responsive fiber optic sensors for automobile occupant protection apparatus and pertains more particularly to control systems for air bag apparatus.

BACKGROUND OF THE INVENTION

One source of an understanding of the state of the art of fiber optic sensors is a publication, entitled "Fiber Optic and Laser Sensors II" *PROCEEDINGS OF SPIE—The International Society for Optical Engineering,* Volume 478, 385-12 through 385-18, May 1–2, 1984. As noted therein, two general classes of sensors are known, the first being based on an optical reflection technique and the second being a microbend technique.

The former technique is not force-responsive, i.e., it is not operative based on mechanical stress applied to an optical fiber.

The latter technique looks to the use of a relatively inflexible optical fiber and the detection of directing of light from the fiber core into the fiber cladding upon distortion of the force-responsive optical fiber. Fiber optic sensors of force-responsive variety using a relatively inflexible optical fiber and based on the microbending technique are shown in U.S. Pat. Nos. 4,420,251, 4,408,829, 4,860,586 and 4,918, 305.

A further version of a force-responsive fiber optic sensor is seen in U.S. Pat. No. 4,750,796, which looks not to microbending of a relatively inflexible optical fiber, but to the use of a quite flexible optical fiber, being comprised of a core and cladding, both formed of an elastomeric material. A similar fiber optic sensor is shown in U.S. Pat. No. 4,830,461.

In the particular area of air bag control, which is a preferred area of interest of the subject invention, note is taken of U.S. Pat. No. 4,988,862. Therein, an air bag actuation is caused to occur when an optical fiber is broken and light communication between a transmitter and a receiver is fully interrupted.

BRIEF SUMMARY OF THE INVENTION

The primary object of the present invention is to provide improved force-responsive fiber optic sensors employing quite flexible optical fibers.

A more particular object of the invention is to provide a control system for activating occupant protective automotive apparatus through the use of force-responsive sensors employing quite flexible optical fibers.

A specific object of the invention is to provide a control system for activating automotive air bag apparatus through the use of force-responsive sensors employing quite flexible optical fibers.

In attaining these objects, the invention provides a fiber optic sensor for the sensing of forces imposed on the sensor in a predetermined direction, the sensor comprising a housing and an optical fiber of a type which is self-deformable in response to forces imposed on the sensor. The housing retentively engages first and second opposed ends of the fiber and places the fiber in tangential contiguity with an interior surface of the housing, the housing defining a cavity aside the fiber permitting movement of the fiber therein and distal from the tangential contiguity thereof with the interior surface. In the predetermined force imposition direction, the cavity is successive to the interior surface of the housing.

The arrangement of the subject invention, as respects the above-discussed relative disposition of a cavity and a housing interior surface in respect of a force imposition direction will be seen to be converse to that of the sensors of U.S. Pat. No. 4,750,796 and U.S. Pat. No. 4,830,461, each of which show sensors having the housing surface successive to the cavity in the force imposition direction.

In a particularly preferred sensor embodiment of the invention, sensor output is obtained on the basis of the optical fiber displacing itself in response to force imposition on the sensor, i.e., based on the inertial mass and the inherent flexibility of the optical fiber. In an alternate preferred embodiment, a force-imposing body is supported in the housing interior surface in force-imposing relation to the fiber, in which case displacement of the optical fiber is attributable to the fiber displacing itself and being displaced by the force-imposing body in response to force imposition on the sensor.

The automobile occupant protection apparatus may comprise an air bag having an activation controller and the control system conducts an input control signal to the air bag activation controller.

While the control system summarized to this juncture has a single force-directional sensitivity, it may have plural force-directional sensitivities and facility for selective inhibition of generation of the input control signal to the controlled apparatus.

In this respect the invention provides a system for generating an input signal for control of automobile occupant protection apparatus of an automobile having a preselected forward travelling direction, the system comprising first apparatus, inclusive of a first fiber optic sensor responsive to first forces imposed thereon in a first direction opposite the preselected forward travelling direction, for providing a first output indicative of characteristics of the first forces, second apparatus, inclusive of a second fiber optic sensor responsive to second forces imposed thereon in a second direction different from the direction opposite the preselected forward travelling direction, for providing a second output indicative of characteristics of the second forces and third apparatus responsive to the first and second outputs for selectively generating the input signal.

The foregoing and other objects and features of the invention will be further understood from the following detailed description of preferred embodiments thereof and from the drawings, wherein like reference numerals identify like components throughout.

DETAILED DESCRIPTION OF PREFERRED EMBODIMENTS AND PRACTICES

Figure 1:
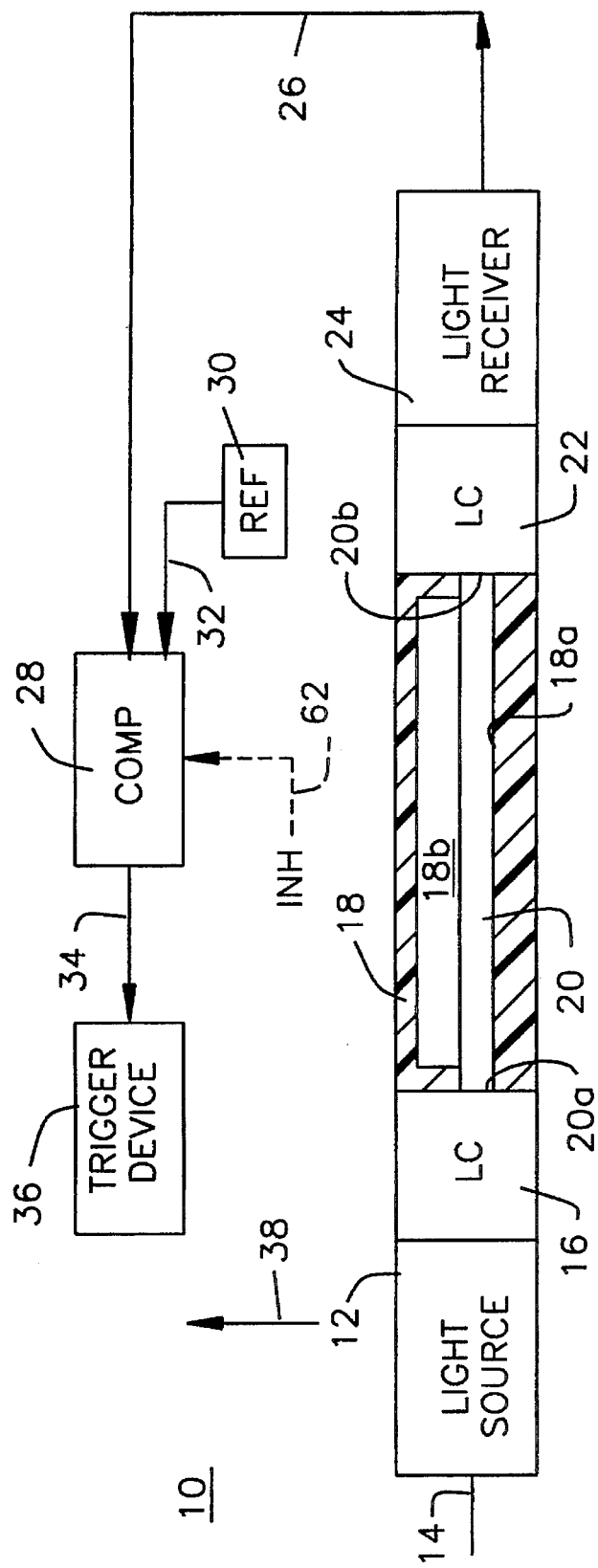
FIG. 1 is a schematic drawing of a first embodiment of a control system in accordance with the invention, with housing 18 shown in central section.

Referring to FIG. 1, control system 10 includes light source 12, operation of which occurs when electrical power is applied to input line 14 thereof. Source 12 may comprise an LED (light emitting diode) or the like. Light output of source 12 is applied to light coupler (LC) 16, which may be a flat lens.

Housing 18, shown in central section, defines a motion impeding interior surface 18a and a motion permitting cavity 18b. Optical fiber 20 may be one of various commercially available optical fibers of highly flexible character, constituted of a cladding and a core both of elastomeric material. End face 20a of fiber 20 is in light receiving relation with light coupler 16 and end face 20b is in light receiving relation with light coupler 22 which may also be constituted as a flat lens.

Light receiver 24 receives light from light coupler 22 and provides an electrical output signal on line 26 indicative of a characteristic of received light, such as its amplitude. Receiver 24 may be constituted by a photocell or the like.

The line 26 signal is furnished as a first input to comparator (COMP) 28. A second input to the comparators where the received light characteristic is amplitude, is an amplitude reference level generated by reference unit (REF) 30 furnished over line 32. The comparator output is furnished over line 34 to trigger device 36, which activates the automobile occupant protection apparatus (not shown). Device 36 may be a component of the latter, in which case control system 10 concludes with line 34.

Arrow 38 indicates the forward motion direction of the automobile and housing 18 is supported in the automobile generally orthogonal to the forward motion direction. Accordingly, with fiber 20 disposed in the housing in contiguity with housing motion impeding surface 18a the fiber is rendered unresponsive to forces attending forward acceleration of the automobile. On the other hand, with housing 18 defining motion permitting cavity 18b opposite surface 18a, fiber 20 is responsive to forces attending deceleration of the automobile and self deforms, based on its inertial mass, in response thereto, given its high degree of flexibility. The foregoing "predetermined force imposition direction" will thus be recognized as being the direction indicated by arrow 38 and the position of cavity 18b will be appreciated as being successive to the position of surface 18a in the predetermined direction.

In setting up the control system, light source 12 is activated, transmitting a given amount of light through fiber 20 to light receiver 24. Housing 18 is then subjected to force in the direction of arrow 38 equal to the force, where control is to be effected over air bag apparatus, i.e., deceleration corresponding to that at which the air bag apparatus is to be activated. The signal level on line 26, i.e., the light receiver output, is noted and REF 30 is adjusted to provide a signal equal to the noted level on line 26. Comparator 28 is selected to be of type providing an output signal on line 34 only where the input signal thereto on line 26 has a level which is equal to or less than the level of the line 32 input to comparator 28.

Figure 2:
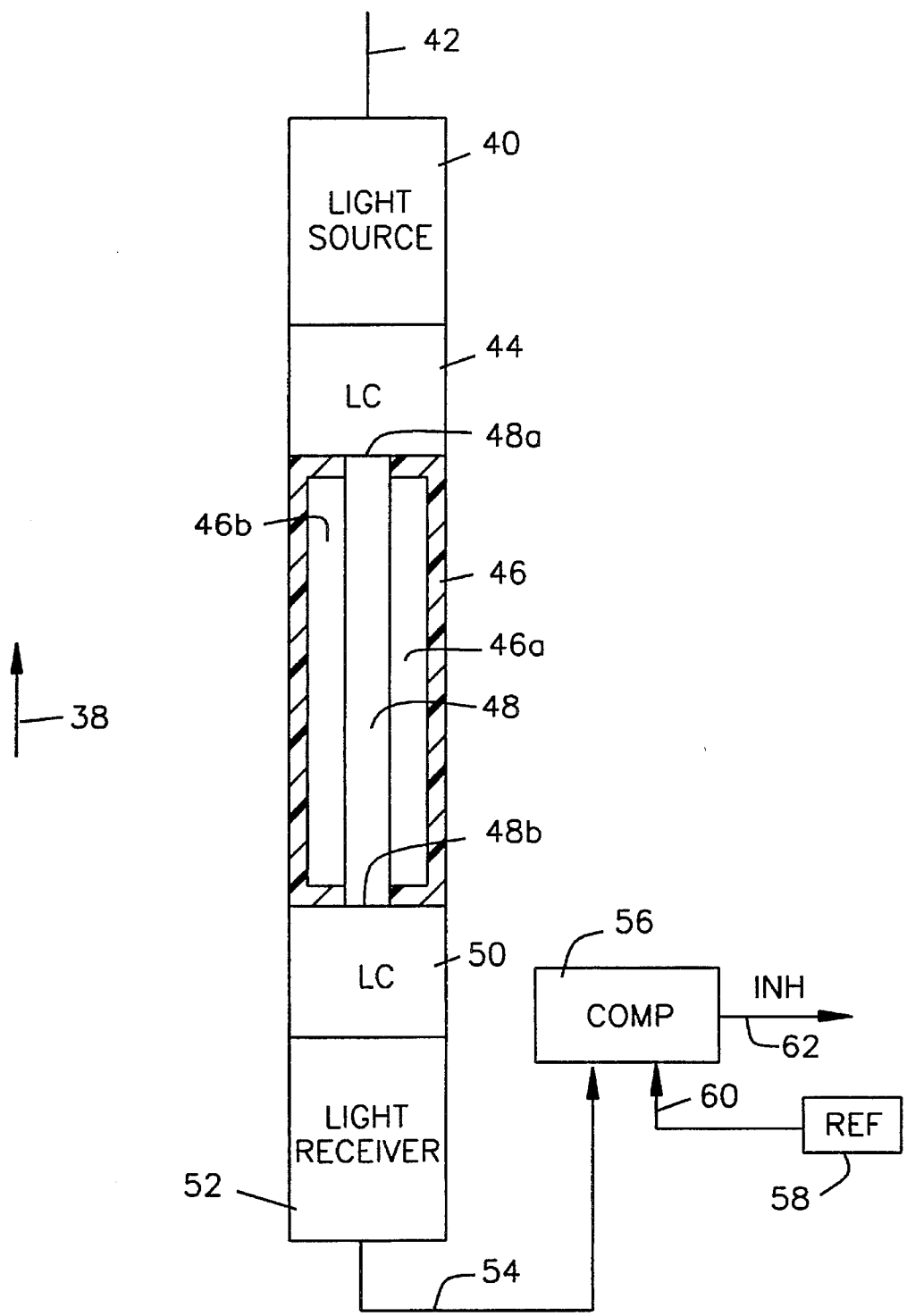
FIG. 2 is a schematic drawing of apparatus usable with the FIG. 1 to provide a second embodiment of a control system in accordance with the invention.

Turning to FIG. 2, the apparatus shown therein is usable with the FIG. 1 system to provide a second embodiment of a control system in accordance with the invention, and particularly to provide the optional input INH (inhibit) indicated by phantom line 62 in FIG. 1.

The FIG. 2 apparatus includes light source 40, operation of which occurs when electrical power is applied to input line 42 thereof. Source 40 may comprise an LED (light emitting diode) or the like. Light output of source 40 is applied to light coupler (LC) 44, which may be a flat lens.

Housing 46, shown in central section, defines a motion permitting cavity 46a. Optical fiber 48 is of highly flexible composition, for example, constituted of a cladding and a core both of elastomeric material. End face 48a of fiber 48 is in light receiving relation with light coupler 44 and end face 48b is in light receiving relation with light coupler 50 which may also be constituted as a flat lens.

Light receiver 52 receives light from light coupler 50 and provides an electrical output signal on line 54 indicative of a characteristic of received light, such as its amplitude. Receiver 52 may be constituted by a photocell or the like.

The line 54 signal is furnished as a first input to comparator (COMP) 56. A second input to the comparator is a reference level generated by reference unit (REF) 58 furnished over line 60.

The FIG. 2 apparatus is disposed in an automobile with housing 46 generally orthogonal to the disposition of housing 18 of FIG. 1, i.e., in alignment with forward motion direction arrow 38.

Housing 46 differs from housing 18 in that the former does not define a motion impeding surface in contiguity with the fiber therein. Cavity 46a is thus bounded by wall structure which is spaced in all directions from the centrally disposed fiber 48. Fiber 48 is accordingly self-deformable upon automobile crash impact orthogonally of the forward direction of motion of the automobile, i.e., from either side.

Setup of the FIG. 2 apparatus involves the deformation of fiber 48 to a measure corresponding with a level of sideward impact at which it is desired not to activate automobile occupant protection apparatus responsively to the presence of conditions otherwise causing comparator 28 of FIG. 1 to activate trigger device 36. The output signal of receiver 52 is noted under such deformation of fiber 48 and REF 58 is adjusted to provide a signal on line 60 of like level. Comparator 56 is selected to provide an output signal on line 62 (INH) when the line 54 signal level is equal to or less than the line 60 signal level.

In configuring the composite control system employing the FIG. 2 apparatus in the FIG. 1 control system, the output stage of comparator 28 is modified to include a gate having one input from line 26 and a second input from the line 62 and operative not to pass the line 34 signal on concurrent presence of the line 62 signal.

Figure 3:
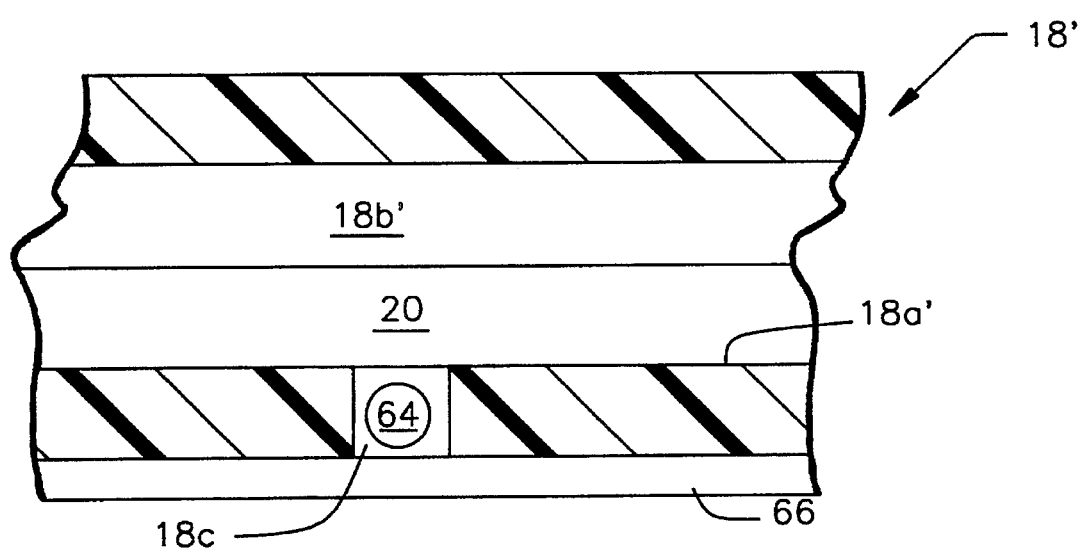
FIG. 3 is a partial showing of housing apparatus alternately usable in practicing the invention.

Turning to FIG. 3, it depicts an enlarged partial view of housing 18' which is usable alternatively to housing 18. Housing 18' has motion impeding interior surface 18a' and motion permitting cavity 18b'. Surface 18a' is discontinuous, the housing having passage 18c' opening into surface 18a'. Spherical body 64 is retained in the passage by retaining layer 66, which closes the passage after disposition of body 64 therein. Body 64 is freely movable in passage 18c' in response to deceleration of housing 18'. Whereas in the FIG. 1 housing embodiment, reliance is placed on the use of the mass of the fiber itself to self-deform the fiber, in the FIG. 3 embodiment, force is also mechanically imposed on the fiber directly by body 64. By way of summary of the foregoing and introduction to ensuing claims, the invention will be seen to provide a fiber optic sensor for the sensing of forces imposed thereon in a predetermined direction, the sensor comprising a housing and an optical fiber of a type which is self-deformable in response to forces imposed on the sensor, the housing retentively engaging first and second opposed ends of the fiber and placing the fiber in tangential contiguity with an interior surface of the housing, the housing defining a cavity aside the fiber permitting movement of the fiber therein and distal from the tangential contiguity of the fiber with the housing interior surface, the cavity and the fiber being successive to the housing interior surface and the cavity being successive to the fiber in the predetermined force imposition direction.

Further, the sensor may comprise first and second light couplers respectively disposed at the optical fiber first and second ends, light generating means in communication with the first light coupler and transmitting light therethrough into the optical fiber, light receiving means in communication with the second light coupler and generating an output signal indicative of characteristics of light received thereby from the second light coupler and comparator means for receiving the output signal generated by the light receiving means and generating a sensor output signal selectively in accordance with the characteristics indicated in the output signal.

The invention will also be seen to provide a system generating an input signal for control of a triggering component of an automobile occupant protection apparatus of an automobile having a forward travelling direction, the system comprising:

(a) a fiber optic sensor for the sensing of forces imposed thereon in a predetermined direction opposite the forward travelling direction, the sensor comprising a housing and an optical fiber of a type which is self-deformable in response to forces imposed on the sensor, the housing retentively engaging first and second opposed ends of the fiber and placing the fiber in tangential contiguity with an interior surface of the housing, the housing defining a cavity aside the fiber permitting movement of the fiber therein and distal from the tangential contiguity of the fiber with the housing interior surface, the cavity being successive to the housing interior surface and the fiber in the predetermined force imposition direction;

(b) first and second light couplers respectively disposed at the optical fiber first and second ends;

(c) light generating means in communication with the first light coupler and transmitting light therethrough into the optical fiber;

(d) light receiving means in communication with the second light coupler and generating an output signal indicative of characteristics of light received thereby from the second light coupler; and (e) comparator means for receiving the output signal generated by the light receiving means and generating the input signal selectively in accordance with the characteristics indicated in the output signal.

The system further may comprise a second fiber optic sensor for the sensing of forces imposed thereon in a preselected direction different from the predetermined direction opposite the forward travelling direction. The second fiber optic sensor may include a second optical fiber having first and second ends, the system further comprising third and fourth light couplers respectively disposed at the first and second ends of the second optical fiber, the system including a further light generating means in communication with the third light coupler and transmitting light therethrough into the second optical fiber, second light receiving means in communication with the fourth light coupler and generating an output signal indicative of characteristics of light received thereby from the fourth light coupler and further comparator means for receiving the output signal generated by the second light receiving means and generating an inhibit signal selectively in accordance with the characteristics indicated in the second light receiving means output signal, the first-mentioned comparator means being rendered inoperative to generate the input signal upon receipt of the inhibit signal.

Still further, the invention will be seen to provide a system generating an input signal for control of a triggering component of an automobile occupant protection apparatus of an automobile having a preselected forward travelling direction, the system comprising:

(a) first means, inclusive of a first fiber optic sensor responsive to first forces imposed thereon in a first direction opposite the preselected forward travelling direction, for providing a first output signal indicative of characteristics of the first forces;

(b) second means, inclusive of a second fiber optic sensor responsive to second forces imposed thereon in a second direction different from the first direction for providing a second output signal indicative of characteristics of the second forces; and (c) comparator means responsive to the first and second outputs for selectively generating the input signal.

In a last aspect, the invention will be seen to provide a system generating an input signal for control of a triggering component of an automobile occupant protection apparatus of an automobile, the system comprising:

(a) first means, inclusive of a first fiber optic sensor responsive to first forces imposed thereon in a first direction for providing a first output indicative of characteristics of the first forces;

(b) second means, inclusive of a second fiber optic sensor responsive to second forces imposed thereon in a second direction different from the first direction for providing a second output indicative of characteristics of the second forces; and (c) comparator means responsive to the first and second outputs for selectively generating the input signal.

The system of the invention last described arrange for the first means to include a housing supporting an optical fiber of the first fiber optic sensor, the housing being configured to render the optical fiber substantially unresponsive to forces imposed thereon other than the first forces. As will be appreciated, the structure of FIG. 1, wherein the housing defines a cavity aside the fiber permitting movement of the fiber therein and distal from the tangential contiguity of the fiber with the housing interior surface, the cavity and the fiber being successive to the housing interior surface and the cavity being successive to the fiber in the predetermined force imposition direction, is an example of such housing configuration.

Various changes in structure to the described systems and apparatus and modifications in the described practices may evidently be introduced without departing from the invention. Accordingly, it is to be understood that the particularly disclosed and depicted embodiments are intended in an illustrative and not in a limiting sense. The true spirit and scope of the invention are set forth in the following claims.

What is claimed is:

1. A fiber optic sensor for the sensing of forces imposed thereon in a predetermined direction, said sensor comprising a housing and an optical fiber of a type which is self-deformable in response to forces imposed on said sensor, said housing retentively engaging first and second opposed ends of said fiber and placing said fiber in tangential contiguity with an interior surface of said housing, said housing defining a cavity aside said fiber, permitting movement of said fiber therein distal from said tangential contiguity of said fiber with said housing interior surface, said cavity and said fiber being successive to said housing interior surface and the cavity being successive to the fiber in said predetermined force imposition direction.

2. The sensor claimed in claim 1 wherein said housing interior surface is in continuous tangential continuity with said fiber between said fiber first and second ends.

3. The sensor claimed in claim 1, wherein said fiber is comprised of a core and a cladding circumscribing said core, said core and cladding being constituted of flexible material.

4. The sensor claimed in claim 3, wherein said core and cladding are both constituted of an elastomeric material.

5. The sensor claimed in claim 1 further comprising a body supported in said housing interior surface in force-imposing relation to said fiber.

6. The sensor claimed in claim 5, wherein said housing interior surface is discontinuous, defining an opening therein, said body being disposed in said housing interior surface opening.

7. The sensor claimed in claim 6 further comprising a layer disposed on said housing interior surface exteriorly of said opening therein and retaining said body in said opening.

8. The sensor claimed in claim 6, wherein said body is a spherical body.

9. The sensor claimed in claim 1 further comprising first and second light couplers respectively disposed at said optical fiber first and second ends, light generating means in communication with said first light coupler and transmitting light therethrough into said optical fiber, light receiving means in communication with said second light coupler and generating an output signal indicative of characteristics of light received thereby from said second light coupler and comparator means for receiving said output signal generated by said light receiving means and generating a sensor output signal selectively in accordance with said characteristics indicated in said output signal.

10. A system generating an input signal for control of a triggering component of an automobile occupant protection apparatus of an automobile having a forward travelling direction, said system comprising:

(a) a fiber optic sensor for the sensing of forces imposed thereon in a predetermined direction opposite said forward travelling direction, said sensor comprising a housing and an optical fiber of a type which is self-deformable in response to forces imposed on said sensor, said housing retentively engaging first and second opposed ends of said fiber and placing said fiber in tangential contiguity with an interior surface of said housing, said housing defining a cavity aside said fiber permitting movement of said fiber therein and distal from said tangential contiguity of said fiber with said housing interior surface, said cavity being successive to said housing interior surface and the fiber in said predetermined force imposition direction;

(b) first and second light couplers respectively disposed at said optical fiber first and second ends;

(c) light generating means in communication with said first light coupler and transmitting light therethrough into said optical fiber;

(d) light receiving means in communication with said second light coupler and generating an output signal indicative of characteristics of light received thereby from said second light coupler; and (e) comparator means for receiving said output signal generated by said light receiving means and generating said input signal selectively in accordance with said characteristics indicated in said output signal.

11. The system claimed in claim 10, wherein said housing interior surface is in continuous tangential continuity with said fiber between said fiber first and second ends.

12. The system claimed in claim 10, wherein said fiber is comprised of a core and a cladding circumscribing said core, said core and cladding being constituted of flexible material.

13. The system claimed in claim 12, wherein said core and cladding are both constituted of an elastomeric material.

14. The system claimed in claim 10 further comprising a body supported in said housing interior surface in force-imposing relation to said fiber.

15. The system claimed in claim 14, wherein said housing interior surface is discontinuous, defining an opening therein, said body being disposed in said housing interior surface opening.

16. The sensor claimed in claim 15 further comprising a layer disposed on said housing interior surface exteriorly of said opening therein and retaining said body in said opening.

17. The sensor claimed in claim 15, wherein said body is a spherical body.

18. The system claimed in claim 10 further comprising a second fiber optic sensor for the sensing of forces imposed thereon in a preselected direction different from said predetermined direction opposite said forward travelling direction.

19. The system claimed in claim 18, wherein said second fiber optic sensor includes a second optical fiber having first and second ends, said system further comprising third and fourth light couplers respectively disposed at said first and second ends of said second optical fiber, said system including a further light generating means in communication with said third light coupler and transmitting light therethrough into said second optical fiber, second light receiving means in communication with said fourth light coupler and generating an output signal indicative of characteristics of light received thereby from said fourth light coupler and further comparator means for receiving said output signal generated by said second light receiving means and generating an inhibit signal selectively in accordance with said characteristics indicated in said second light receiving means output signal is a predetermined characteristic, said first-mentioned comparator means being rendered inoperative to generate said input signal upon receipt of said inhibit signal.

20. A system generating an input signal for control of a triggering component of an automobile occupant protection apparatus of an automobile having a preselected forward travelling direction, said system comprising:

(a) first means, inclusive of a first fiber optic sensor responsive to first forces imposed thereon in a first direction opposite said preselected forward travelling direction, for providing a first output signal indicative of characteristics of said first forces;

(b) second means, inclusive of a second fiber optic sensor responsive to second forces imposed thereon in a second direction different from said first direction for providing a second output signal indicative of characteristics of said second forces; and (c) comparator means responsive to said first and second outputs for selectively generating said input signal.

21. The system claimed in claim 20, wherein said first means includes a housing supporting an optical fiber of said first fiber optic sensor, said housing being configured to render said optical fiber substantially unresponsive to forces imposed thereon other than said first forces.

22. The system claimed in claim 20, wherein said first means includes a housing supporting an optical fiber of said first fiber optic sensor, said housing being configured to render said optical fiber substantially unresponsive to forces imposed thereon other than said first forces.

23. A system generating an input signal for control of a triggering component of an automobile occupant protection apparatus of an automobile, said system comprising:

(a) first means, inclusive of a first fiber optic sensor responsive to first forces imposed thereon in a first direction for providing a first output indicative of characteristics of said first forces;

(b) second means, inclusive of a second fiber optic sensor responsive to second forces imposed thereon in a second direction different from said first direction for providing a second output indicative of characteristics of said second forces; and (c) comparator means responsive to said first and second outputs for selectively generating said input signal.

* * * * *